(12) United States Patent
Nakagawa et al.

(10) Patent No.: US 8,134,325 B2
(45) Date of Patent: Mar. 13, 2012

(54) CONTROLLER

(75) Inventors: Hideyuki Nakagawa, Tsukuba (JP);
Nobuhiro Ishikawa, Best (NL)

(73) Assignee: Mitutoyo Corporation, Kawasaki (JP)

( * ) Notice: Subject to any disclaimer, the term of this patent is extended or adjusted under 35 U.S.C. 154(b) by 420 days.

(21) Appl. No.: 12/453,611

(22) Filed: May 15, 2009

(65) Prior Publication Data

US 2009/0302797 A1 Dec. 10, 2009

(30) Foreign Application Priority Data

Jun. 6, 2008 (JP) ................................. 2008-148986

(51) Int. Cl.
*G05D 3/12* (2006.01)
(52) U.S. Cl. ........................................ 318/575; 318/632
(58) Field of Classification Search .................. 318/560, 318/568.22, 575, 606–610, 619, 621, 632
See application file for complete search history.

(56) References Cited

U.S. PATENT DOCUMENTS

| | | | | |
|---|---|---|---|---|
| 4,302,666 A | * | 11/1981 | Hawkins | 235/404 |
| 4,748,393 A | * | 5/1988 | Fincher et al. | 318/638 |
| 4,866,361 A | * | 9/1989 | Donley et al. | 318/584 |
| 5,105,135 A | * | 4/1992 | Nashiki et al. | 318/568.11 |
| 5,107,193 A | * | 4/1992 | Iwashita | 318/560 |
| 5,216,342 A | * | 6/1993 | Torii et al. | 318/568.1 |
| 5,311,110 A | * | 5/1994 | Iwashita | 318/568.15 |
| 5,404,289 A | | 4/1995 | Hang et al. | |
| 6,373,072 B1 | * | 4/2002 | Butler et al. | 250/492.24 |

OTHER PUBLICATIONS

Sciavicco et al., "Modelling and Control of Robot Manipulators," Springer Verlag, 2000, pp. 227-231, London.
Chiu et al., "Adaptive Control of Holonomic Constrained Systems: A Feedforward Fuzzy Approximation-Based Approach," IEEE Transactions on Control Systems Technology, May 2006, pp. 456-466, vol. 14, No. 3.
European Search Report issued in Application No. EP 09 160 704.4; mailed Sep. 30, 2009.
Yoshikazu et al., "Motion Control—Practical Mechatronics," (1996), pp. 135-145, Sangyo-Tosho, Japan, (with partial translation).

* cited by examiner

*Primary Examiner* — Bentsu Ro
(74) *Attorney, Agent, or Firm* — Oliff & Berridge, PLC

(57) ABSTRACT

The controller includes a position commander and an error corrector. The position commander outputs a position command value for moving a moving mechanism. The error corrector includes a feedforward controller and a compensator calculator. The feedforward controller performs a feedforward control of the moving mechanism based on the position command value outputted from the position commander and includes a compensator. The compensator calculator calculates a value to be set as the compensator of the feedforward controller based on the position command value outputted from the position commander.

7 Claims, 3 Drawing Sheets

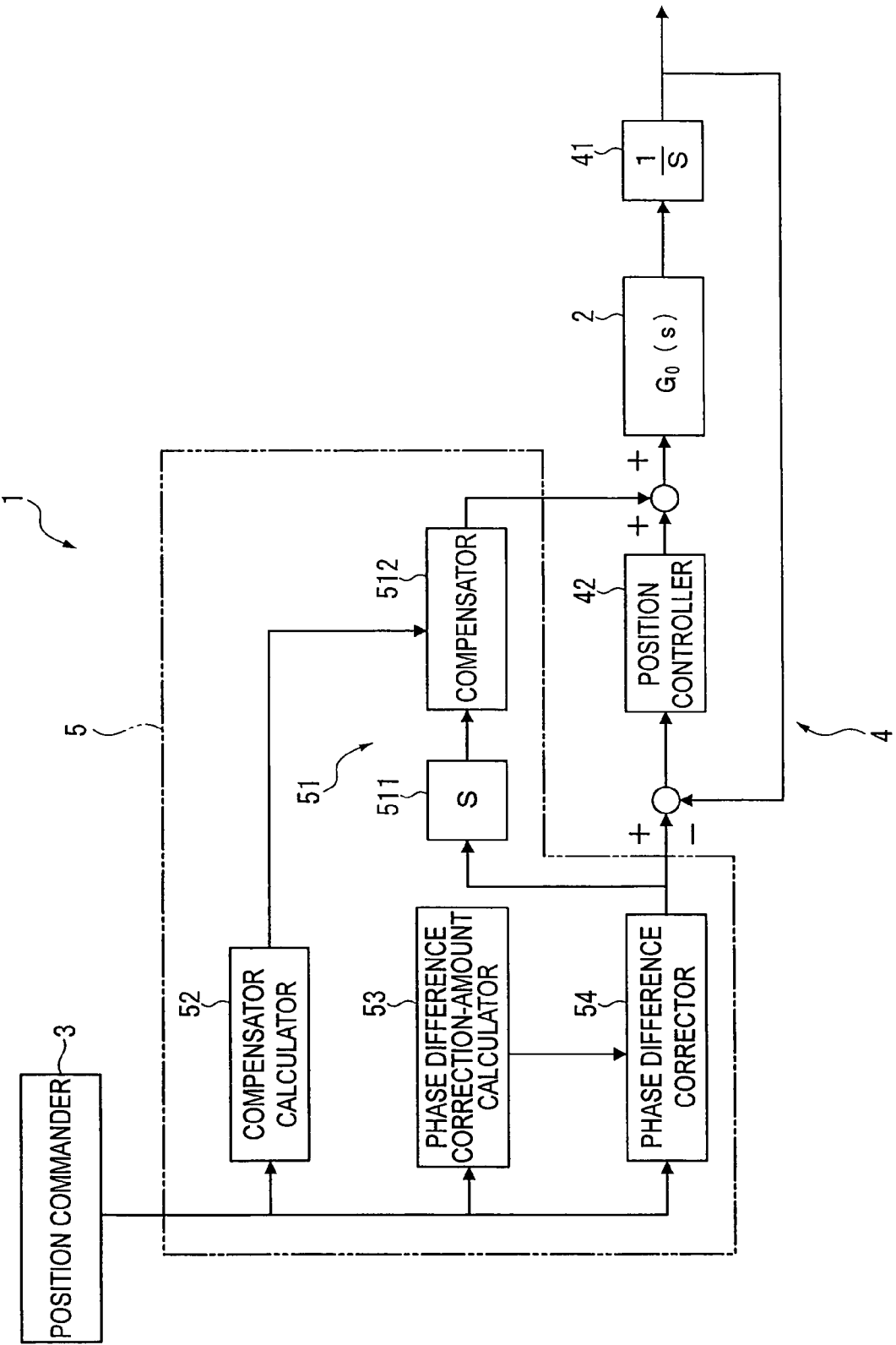

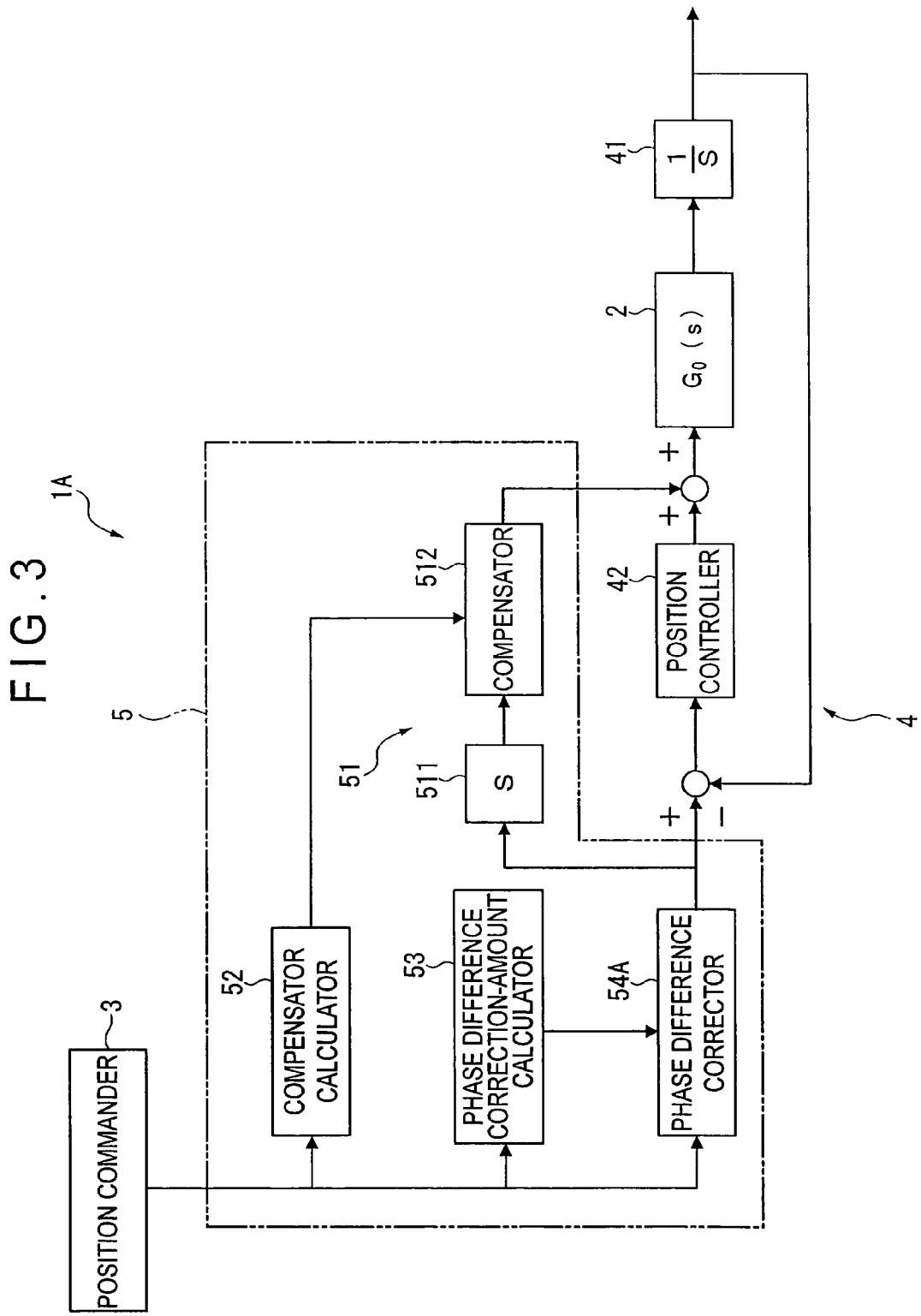

CONTROLLER

BACKGROUND OF THE INVENTION

1. Field of the Invention

The present invention relates to a controller.

2. Description of Related Art

A coordinate measuring machine or a machine tool has been known in which a moving mechanism has a plurality of moving axes for moving a probe for measurement, a tool or the like. Such a coordinate measuring machine or a machine tool includes a controller for controlling the moving mechanism based on a position command value.

When the controller controls the moving mechanism, an error between the position command value and a position of the moving mechanism (hereinafter referred to as a route error) may be caused by difference in response characteristics of the respective moving axes.

As a typical control system for reducing such a route error, a feedforward control system including a predetermined compensator has been known (for example, see Document 1: Fujino Yoshikazu, Kyura Nobuhiro "MOTION CONTROL—Practical Mechatronics" Sangyo-Tosho, 1996, Pages 135 to 140).

Typically, when the moving speed of the moving mechanism is increased, the response characteristics of the respective moving axes are changed depending on the moving speed.

However, in the control system disclosed in Document 1, since a value of the compensator is constant, the compensator cannot follow the change of the response characteristics of the respective moving axes while the moving mechanism moves at high speed. Thus, the route error cannot be sufficiently reduced.

SUMMARY OF THE INVENTION

An object of the invention is to provide a controller capable of sufficiently reducing a route error during high-speed movement.

A controller according to an aspect of the invention that controls a moving mechanism including a plurality of moving axes includes: a position commander that outputs a position command value for moving the moving mechanism; and an error corrector that corrects an error between the position command value and a position of the moving mechanism, in which the error corrector includes a feedforward controller that performs a feedforward control of the moving mechanism based on the position command value, and a compensator calculator that calculates a compensator of the feedforward controller based on the position command value.

Since the compensator calculator calculates the compensator based on the position command value according to the aspect of the invention, the compensator corresponding to the moving speed of the moving mechanism can be obtained. Also, since the feedforward controller performs the feedforward control using the compensator calculated by the compensator calculator, the route error can be sufficiently reduced even during the high-speed movement.

More specifically, when the position command value is outputted for moving the moving mechanism circularly at a constant angular velocity, for instance, such a route error that the movement of the moving mechanism describes an elliptical trajectory because of difference in gains of the response characteristics of the respective moving axes. At this time, a long axis and a short axis of the elliptical trajectory described by the moving mechanism substantially coincide with the respective directions of the moving axes.

According to the aspect of the invention, the compensator calculator can calculate the compensator corresponding to a radius, an angular velocity and a frequency of the circular motion based on the position command value. Thus, the route error can be corrected, thereby sufficiently reducing the route error even during the high-speed movement.

In the controller according to the aspect of the invention, the error corrector may include a phase difference correction-amount calculator that calculates a phase difference correction-amount for correcting a phase difference among the moving axes based on the position command value, and a phase difference corrector that corrects the phase difference among the moving axes based on the phase difference correction-amount.

According to such an arrangement, the phase difference correction-amount calculator calculates the phase difference correction-amount based on the position command value. Thus, the phase difference correction-amount corresponding to the moving speed of the moving mechanism can be obtained. Subsequently, the phase difference corrector corrects the phase difference among the moving axes based on the phase difference correction-amount calculated by the phase difference correction-amount calculator. Thus, the route error can be sufficiently reduced even during the high-speed movement.

More specifically, when the position command value is outputted for moving the moving mechanism circularly at a constant angular velocity, for instance, such a route error that the movement of the moving mechanism describes an elliptical trajectory is generated due to the difference in the phase of the response characteristics of the respective moving axes. At this time, a long axis and a short axis of the elliptical trajectory described by the moving mechanism extend in directions different from the directions of the moving axes.

According to the aspect of the invention, the phase difference correction-amount calculator calculates the compensator corresponding to the radius, angular velocity and frequency of the circular motion based on the position command value. Thus, the route error can be corrected, thereby sufficiently reducing the route error even during the high-speed movement.

In the controller according to the aspect of the invention, the phase difference corrector may correct the phase difference among the moving axes by performing a coordinate transformation of the position command value based on the phase difference correction-amount.

With such an arrangement, the same advantages can be attained as those of the above-described controller.

In the controller according to the aspect of the invention, the phase difference corrector may correct the phase difference among the moving axes by delaying the position command value based on the phase difference correction-amount.

With such an arrangement, the same advantages can be attained as those of the above-described controller.

The controller according to the aspect of the invention may further includes a feedback controller that includes a position controller for outputting to the moving mechanism a speed command value based on the error and performs a feedback control of the moving mechanism, in which a feedforward controller performs a feedforward control of the moving mechanism by performing a first order differentiation of the position command value, multiplying the position command value by the compensator, and then adding the position command value to the speed command value.

With such an arrangement, the same advantages can be attained as those of the above-described controller.

In the controller according to the aspect of the invention, the position commander may output the position command value for circularly moving the moving mechanism and the error corrector may correct the error based on at least one of a radius and a frequency of the circular motion.

The route error generated when the position command value for moving the moving mechanism circularly is outputted occurs depending on the radius and frequency of the circular motion.

Accordingly, the error corrector corrects the error based on at least one of the radius and frequency of the circular motion. Thus, the route error can be further sufficiently reduced during the high-speed movement.

In the controller according to the aspect of the invention, the error corrector may correct the error based on the position of the moving mechanism.

In the moving mechanism including the plurality of moving axes, the route error is changed depending on the position of the moving mechanism because of its structure.

Accordingly, the error corrector corrects the error based on the position of the moving mechanism. Thus, the route error can be further sufficiently reduced during the high-speed movement.

BRIEF DESCRIPTION OF THE DRAWINGS

FIG. 1 is a block diagram showing a controller and a moving mechanism according to a first exemplary embodiment of the invention.

FIG. 3 is a block diagram showing a controller and a moving mechanism according to a second exemplary embodiment of the invention.

DETAILED DESCRIPTION OF PREFERRED EMBODIMENT(S)

First Exemplary Embodiment

Figure 2A:
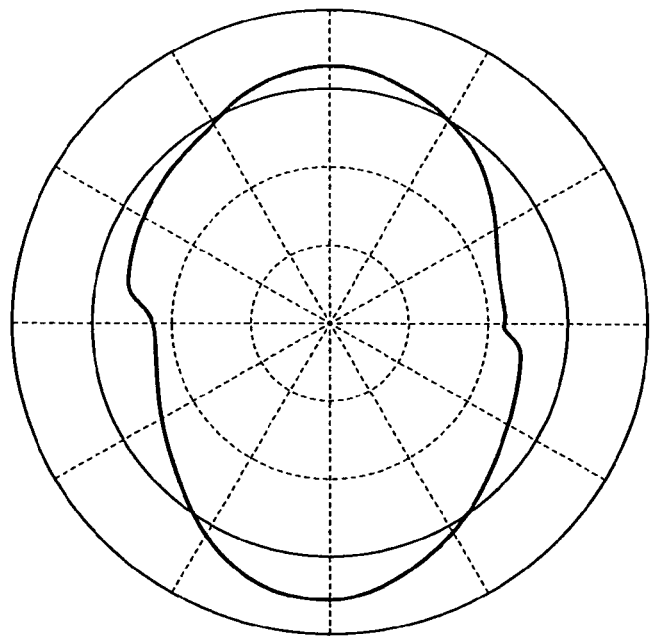
FIG. 2A shows a route error when the moving mechanism according to the first exemplary embodiment is circularly moved at a high constant angular velocity.

A first exemplary embodiment of the invention will be described below with reference to the attached drawings.

FIG. 1 is a block diagram showing a controller 1 and a moving mechanism 2 according to the first exemplary embodiment of the invention.

The controller 1 controls the moving mechanism 2. As shown in FIG. 1, the controller 1 includes a position commander 3, a feedback controller 4, and an error corrector 5.

The moving mechanism 2, which is controllable by the controller 1, includes three moving axes (hereinafter referred to as X, Y and Z axes) orthogonal to each other. The moving mechanism 2 is configured by a typical control system of multiple loops including a speed control loop, current control loop and the like. Incidentally, a transfer function of the moving mechanism 2 is denoted as $G_0(s)$ in FIG. 1.

The position commander 3 outputs a position command value for moving the moving mechanism 2. In this exemplary embodiment, the position commander 3 outputs a position command value for circularly moving the moving mechanism 2.

The feedback controller 4 is for a feedback control of the position of the moving mechanism 2. The feedback controller 4 includes: an integrator 41 for integrating the speed of each moving axis of the moving mechanism 2 to output the position of the moving mechanism 2; and a position controller 42 for outputting to the moving mechanism 2 a speed command value based on an error between the position command value outputted from the position commander 3 through the error corrector 5 and the position of the moving mechanism 2 outputted from the integrator 41. Incidentally, in practice, the position of the moving mechanism 2 is detected by a position sensor or the like.

The error corrector 5 corrects the error between the position command value and the position of the moving mechanism 2. The error corrector 5 includes a feedforward controller 51, a compensator calculator 52, a phase difference correction-amount calculator 53, and a phase difference corrector 54.

The feedforward controller 51 is for a feedforward control of the moving mechanism 2 based on the position command value outputted from the position commander 3 through the phase difference corrector 54. The feedforward controller 51 includes a differentiator 511 for differentiating the position command value to output a speed command value and a compensator 512 to be multiplied with the speed command value outputted from the differentiator 511.

The speed command value multiplied by the compensator 512 and the speed command value outputted from the position controller 42 are added together to be outputted to the moving mechanism 2.

The compensator calculator 52 calculates a value to be set as the compensator 512 (hereinafter referred to as feedforward gain $K_{FF}$) based on the position command value outputted from the position commander 3. Specifically, the compensator calculator 52 calculates the feedforward gain $K_{FF}$ by a function F1 of a radius $R_{XYZ}$ and frequency $f_{XYZ}$ of the circular motion of the moving mechanism 2 based on the position command value as represented by the following formula (1). Also, when the route error is changed depending on the position of the moving mechanism 2 because of its structure, the compensator calculator 52 calculates the feedforward gain $K_{FF}$ by a function F2 of the radius $R_{XYZ}$, the frequency $f_{XYZ}$, and a position $(X_P, Y_P, Z_P)$ of the moving mechanism 2 as represented by the following formula (2). Incidentally, the position of the moving mechanism 2 is detected by a position sensor or the like provided on the moving mechanism 2.

$$K_{FF}=F1(f_{XYZ},R_{XYZ}) \tag{1}$$

$$K_{FF}=F2(f_{XYZ},R_{XYZ},X_P,Y_P,Z_P) \tag{2}$$

The radius $R_{XYZ}$ and frequency $f_{XYZ}$ of the circular motion of the moving mechanism 2 are calculated based on the position command value $(X_R, Y_R, Z_R)$ and the center position $(X_0, Y_0, Z_0)$ of the circular motion as represented by the following formulae (3) and (4). Note that "s" in the formula (4) denotes the Laplace operator.

$$R_{XYZ}=\sqrt{(X_R-X_0)^2+(Y_R-Y_0)^2+(Z_R-Z_0)^2} \tag{3}$$

$$f_{XYZ}=\sqrt{(X_R \cdot s)^2+(Y_R \cdot s)^2+(Z_R \cdot s)^2}/(2\pi R_{XYZ}) \tag{4}$$

Next, a method of calculating the functions F1 and F2 in the formulae (1) and (2) will be described.

The function F1 is calculated based on an average value of the route error (hereinafter referred to as an average error AE) when the moving mechanism 2 is circularly moved at a constant angular velocity. The average error AE is obtained by averaging differences between time-series data of the position command value outputted from the position commander 3 and time-series data of the respective positions of the moving mechanism 2.

In this exemplary embodiment, the average error AE is obtained based on time-series data when the moving mechanism 2 is circularly moved on any two planes of an XY plane, an XZ plane and a YZ plane. Since the time-series data when the moving mechanism 2 is circularly moved on the two planes are used, the response characteristic of each moving axis of the X, Y and Z axes can be taken into consideration.

In addition, such conditions as the feedforward gain $K_{FF}$, and the frequency $f_{XYZ}$ and radius $R_{XYZ}$ of the circular motion are respectively changed so as to calculate the average error AE under each condition. Subsequently, as represented by the following formula (5), the average error AE calculated under each condition is approximated by a function F3 of the feedforward gain $K_{FF}$, and the frequency $f_{XYZ}$ and radius $R_{XYZ}$ of the circular motion.

$$AE = F3(K_{FF}, f_{XYZ}, R_{XYZ}) \quad (5)$$

Further, by setting the average error AE to 0 in the formula (5) to solve for the feedforward gain $K_{FF}$, the function F1 can be obtained as represented by the following formulae (6) and (7).

$$F3(K_{FF}, f_{XYZ}, R_{XYZ}) = 0 \quad (6)$$

$$K_{FF} = F1(f_{XYZ}, R_{XYZ}) \quad (7)$$

Similarly to the function F1, the function F2 is obtained based on the average error AE. Then, such conditions as the center position of the circular motion in addition to the feedforward gain $K_{FF}$, and the frequency $f_{XYZ}$ and radius $R_{XYZ}$ of the circular motion are respectively changed so as to calculate the average error AE under each condition. Subsequently, as represented by the following formula (8), the average error AE calculated under each condition is approximated by a function F4 of the feedforward gain $K_{FF}$, the frequency $f_{XYZ}$ and radius $R_{XYZ}$ of the circular motion, and the position of the moving mechanism 2.

$$AE = F4(K_{FF}, f_{XYZ}, R_{XYZ}, X_P, Y_P, Z_P) \quad (8)$$

Further, by setting the average error AE to 0 in the formula (8) to solve for the feedforward gain $K_{FF}$, the function F2 can be obtained as represented by the following formulae (9) and (10).

$$F4(K_{FF}, f_{XYZ}, R_{XYZ}, X_P, Y_P, Z_P) = 0 \quad (9)$$

$$K_{FF} = F2(f_{XYZ}, R_{XYZ}, X_P, Y_P, Z_P) \quad (10)$$

The phase difference correction-amount calculator 53 calculates a phase difference correction-amount $C\phi$ to correct a phase difference among the moving axes of the X, Y and Z axes based on the position command value outputted from the position commander 3. Specifically, as represented by the following formula (11), the phase difference correction-amount calculator 53 calculates a phase difference correction-amount $C\phi_{XY}$ between the X and Y axes, a phase difference correction-amount $C\phi_{XZ}$ between the X and Z axes and a phase difference correction-amount $C\phi_{YZ}$ between the Y and Z axes by functions F5 to F7 of radii $R_{XY}$, $R_{XZ}$, $R_{YZ}$ and frequencies $f_{XY}$, $f_{XZ}$, $f_{YZ}$ of the circular motion of the moving mechanism 2 based on the position command value. Incidentally, the suffixes of the radii R and frequencies f denote radii and frequencies of the circular motion on the XY plane, XZ plane and YZ plane, respectively. Also, when the route error is changed depending on the position of the moving mechanism 2 because of its structure, the phase difference correction-amount calculator 53 calculates the phase difference correction-amounts $C\phi_{XY}$, $C\phi_{XZ}$ and $C\phi_{YZ}$ by functions F8 to F10 of the radii $R_{XY}$, $R_{XZ}$ and $R_{YZ}$, the frequencies $f_{XY}$, $f_{XZ}$ and $f_{YZ}$, and the positions of the moving mechanism 12 as represented by the following formula (12).

$$\begin{aligned} C\phi_{XY} &= F5 \ (f_{XY}, R_{XY}) \\ C\phi_{XZ} &= F6 \ (f_{XZ}, R_{XZ}) \\ C\phi_{YZ} &= F7 \ (f_{YZ}, R_{YZ}) \end{aligned} \quad (11)$$

$$\begin{aligned} C\phi_{XY} &= F8 \ (f_{XY}, R_{XY}, X_P, Y_P, Z_P) \\ C\phi_{XZ} &= F9 \ (f_{XZ}, R_{XZ}, X_P, Y_P, Z_P) \\ C\phi_{YZ} &= F10 \ (f_{YZ}, R_{YZ}, X_P, Y_P, Z_P) \end{aligned} \quad (12)$$

Here, the radii $R_{XY}$, $R_{XZ}$ and $R_{YZ}$ and the frequencies $f_{XY}$, $f_{XZ}$ and $f_{YZ}$ of the circular motion of the moving mechanism 2 are calculated based on the position command value and the center position of the circular motion as represented by the following formulae (13) and (14). Note that, "s" in the formula (14) denotes the Laplace operator.

$$\begin{aligned} R_{XY} &= \sqrt{(X_R - X_0)^2 + (Y_R - Y_0)^2} \\ R_{XZ} &= \sqrt{(X_R - X_0)^2 + (Z_R - Z_0)^2} \\ R_{YZ} &= \sqrt{(Y_R - Y_0)^2 + (Z_R - Z_0)^2} \end{aligned} \quad (13)$$

$$\begin{aligned} f_{XY} &= \sqrt{(X_R \cdot s)^2 + (Y_R \cdot s)^2} \Big/ (2\pi R_{XY}) \\ f_{XZ} &= \sqrt{(X_R \cdot s)^2 + (Z_R \cdot s)^2} \Big/ (2\pi R_{XZ}) \\ f_{YZ} &= \sqrt{(Y_R \cdot s)^2 + (Z_R \cdot s)^2} \Big/ (2\pi R_{YZ}) \end{aligned} \quad (14)$$

The phase difference correction-amount calculator 53 calculates any two of the phase difference correction-amounts $C\phi_{XY}$, $C\phi_{XZ}$ and $C\phi_{YZ}$. This is because, for instance, the phase difference between the Y and Z axes can be corrected by correcting the phase difference between the X and Y axes and the phase difference between the X and Z axes based on the phase difference correction-amounts $C\phi_{XY}$ and $C\phi_{XZ}$.

The phase difference corrector 54 corrects the phase difference among the moving axes by a coordinate transformation of the position command value outputted from the position commander 3 based on the phase difference correction-amount $C\phi$ calculated by the phase difference correction-amount calculator 53. Specifically, the phase difference corrector 54 corrects the phase difference among the moving axes as represented by the following formulae (15-1) to (15-3). When the phase difference correction-amounts $C\phi_{XY}$ and $C\phi_{XZ}$ are calculated by the phase difference correction-amount calculator 53, the phase difference of the moving axes is corrected by the formula (15-1). When the phase difference correction-amounts $C\phi_{XY}$ and $C\phi_{YZ}$ are calculated, the phase difference of the moving axes is corrected by the formula (15-2). When the phase difference correction-amounts $C\phi_{XZ}$ and $C\phi_{YZ}$ are calculated, the phase difference of the moving axes is corrected by the formula (15-3). Subsequently, the corrected position command value $(CX_R, CY_R, CZ_R)$ is outputted to the position controller 42 and the differentiator 511.

$$\begin{pmatrix} CX_R \\ CY_R \\ CZ_R \end{pmatrix} = \begin{pmatrix} 1 & \sin(-C\phi_{XY}) & \sin(-C\phi_{XZ}) \\ 0 & \cos(-C\phi_{XY}) & 0 \\ 0 & 0 & \cos(-C\phi_{XZ}) \end{pmatrix} \begin{pmatrix} X_R \\ Y_R \\ Z_R \end{pmatrix} \quad (15-1)$$

$$\begin{pmatrix} CX_R \\ CY_R \\ CZ_R \end{pmatrix} = \begin{pmatrix} \cos(X\phi_{XY}) & 0 & 0 \\ \sin(C\phi_{XY}) & 1 & \sin(-C\phi_{YZ}) \\ 0 & 0 & \cos(-C\phi_{YZ}) \end{pmatrix} \begin{pmatrix} X_R \\ Y_R \\ Z_R \end{pmatrix} \quad (15-2)$$

$$\begin{pmatrix} CX_R \\ CY_R \\ CZ_R \end{pmatrix} = \begin{pmatrix} \cos(C\phi_{XZ}) & 0 & 0 \\ 0 & \cos(C\phi_{YZ}) & 0 \\ \sin(C\phi_{XZ}) & \sin(C\phi_{YZ}) & 1 \end{pmatrix} \begin{pmatrix} X_R \\ Y_R \\ Z_R \end{pmatrix} \quad (15-3)$$

Next, a method of calculating the functions F5 to F10 in the formulae (11) and (12) will be described.

The functions F5 to F7 are obtained based on the phase difference, which is calculated based on the position of the moving mechanism 2, when the moving mechanism 2 is circularly moved at a constant angular velocity.

In this exemplary embodiment, the phase difference generated when the moving mechanism 2 is circularly moved on any two planes of the XY plane, XZ plane and YZ plane corresponding to the phase difference correction-amount $C\phi$ calculated by the phase difference correction-amount calculator 53 is calculated.

In addition, such conditions as the frequencies $f_{XY}$, $f_{XZ}$ and $f_{YZ}$ and the radii $R_{XY}$, $R_{XZ}$ and $R_{YZ}$ of the circular motion are respectively changed so as to calculate the phase difference under each condition. The functions F5 to F7 are obtained by approximating the phase difference under each condition as functions of the frequencies $f_{XY}$, $f_{XZ}$ and $f_{YZ}$ and the radii $R_{XY}$, $R_{XZ}$ and $R_{YZ}$.

Similarly to the functions F5 to F7, the functions F8 to F10 are calculated based on the phase difference calculated based on the position of the moving mechanism 2 when the moving mechanism 2 is circularly moved at a constant angular velocity. In addition, such conditions as the center position of the circular motion in addition to the frequencies $f_{XY}$, $f_{XZ}$ and $f_{YZ}$, and the radii $R_{XY}$, $R_{XZ}$ and $R_{YZ}$ of the circular motion are respectively changed so as to calculate the phase difference under each condition. Then, the functions F8 to F10 are obtained by approximating the phase difference under each condition as functions of the frequencies $f_{XY}$, $f_{XZ}$ and $f_{YZ}$ and radii $R_{XY}$, $R_{XZ}$ and $R_{YZ}$ of the circular motion, and the positions of the moving mechanism 2.

Figure 2B:
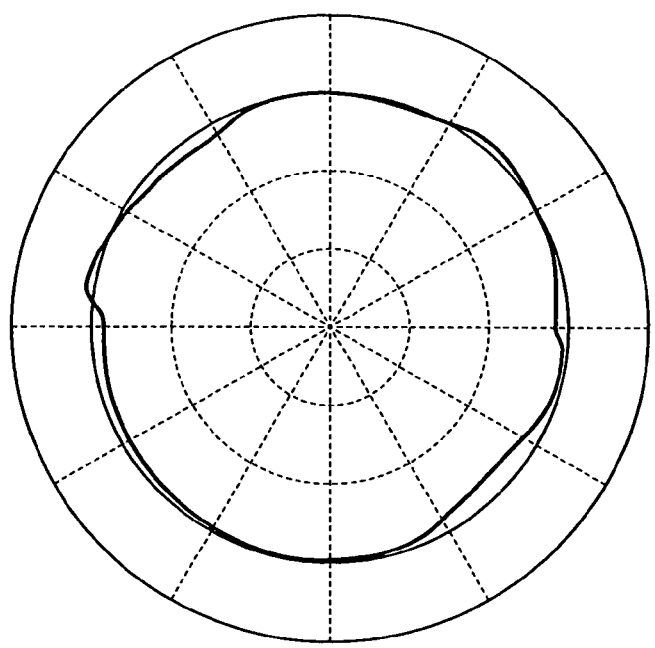
FIG. 2B shows another route error when the moving mechanism according to the first exemplary embodiment is circularly moved at a high constant angular velocity.

FIGS. 2A and 2B show a route error when the moving mechanism 2 is circularly moved at a high constant angular velocity. FIG. 2A shows a route error when the moving mechanism 2 is controlled using a typical feedforward control system including a predetermined compensator, and FIG. 2B shows a route error when the moving mechanism 2 is controlled using the controller 1 of the invention.

In FIGS. 2A and 2B, a circle shown in a second outermost solid line is based on the position command value outputted from the position commander 3.

When the moving mechanism 2 is controlled using the typical feedforward control system including a predetermined compensator, the compensator cannot follow the change of the response characteristic of each moving axis during the movement of the moving mechanism 2 at a high velocity as shown in FIG. 2A. Thus, the route error cannot be sufficiently reduced. Also, due to difference in gains of the response characteristics of the respective moving axes or phase difference, such a route error that the movement of the moving mechanism 2 describes an elliptical trajectory.

On the contrary, when the moving mechanism 2 is controlled using the controller 1 of the invention, the compensator can follow the change of the response characteristic of each moving axis during the movement of the moving mechanism 2 at a high velocity as shown in FIG. 2B. Thus, the route error can be sufficiently reduced. In addition, such a route error that the movement of the moving mechanism 2 describes an elliptical trajectory is not generated.

According to the exemplary embodiment, the following advantages can be attained.

(1) Since the compensator calculator 52 calculates the feedforward gain $K_{FF}$ based on the position command value, the feedforward gain $K_{FF}$ corresponding to the moving speed of the moving mechanism 2 can be obtained. Subsequently, the feedforward controller 51 performs a feedforward control using the feedforward gain $K_{FF}$ calculated by the compensator calculator 52, whereby the route error can be sufficiently reduced even during the high-speed movement.

(2) Since the phase difference correction-amount calculator 53 calculates the phase difference correction-amount $C\phi$ based on the position command value, the phase difference correction-amount $C\phi$ corresponding to the moving speed of the moving mechanism 2 can be obtained. Subsequently, the phase difference corrector 54 corrects the phase difference among the moving axes based on the phase difference correction-amount $C\phi$ calculated by the phase difference correction-amount calculator 53. Thus, the route error can be sufficiently reduced even during the high-speed movement.

(3) Since the error corrector 5 corrects the error based on the radius R and frequency f of the circular motion, the route error can be further sufficiently reduced even during the high-speed movement.

(4) Since the error corrector 5 corrects the error based on the position of the moving mechanism 2, the route error can be further sufficiently reduced even during the high-speed movement.

Second Exemplary Embodiment

A second exemplary embodiment of the invention will be described below with reference to the attached drawings.

In the following description, components which correspond to those of the first exemplary embodiment will be denoted by the same reference numerals, description of which will be omitted.

FIG. 3 is a block diagram showing a controller 1A and the moving mechanism 2 according to the second exemplary embodiment of the invention.

In the first exemplary embodiment, the controller 1 includes the phase difference corrector 54 to correct the phase difference among the moving axes by a coordinate transformation of the position command value outputted from the position commander 3 based on the phase difference correction-amount $C\phi$ calculated by the phase difference correction-amount calculator 53.

On the other hand, the controller 1A includes a phase difference corrector 54A to correct a phase difference among the moving axes by delaying a position command value outputted from the position commander 3 based on the phase difference correction-amount $C\phi$ calculated by the phase difference correction-amount calculator 53 according to the second exemplary embodiment.

The phase difference corrector 54A initially calculates a time-delay correction-amount $\Delta T$ based on the phase difference correction-amount Cφ calculated by the phase difference correction-amount calculator 53 as represented by the following formula (16).

$$\Delta T = \frac{C\phi}{2\pi f} \quad (16)$$

Next, the phase difference corrector 54A delays the position command value outputted from the position commander 3 based on the time-delay correction-amount ΔT given by the formula (16). Subsequently, the corrected position command value is outputted to the position controller 42 and the differentiator 511. More specifically, when a time-delay correction-amount $\Delta T_{XY}$ between Y and X axes is calculated to delay the position command value regarding the X axis, the phase difference corrector 54A calculates a new position command value $NX_R$ which is delayed by the time-delay correction-amount $\Delta T_{XY}$ behind a present position command value $X_R$ by linear interpolation as represented by the formula (17), and outputs the calculated position command value $NX_R$ as the corrected position command value.

$$NX_R = X_R(A_{\Delta T}) + \frac{X_R(A_{\Delta T}+1) - X_R(A_{\Delta T})}{T_S} \cdot B_{\Delta T} \quad (17)$$

Note that, "$A_{\Delta T}$" denotes a quotient of $\Delta T_{XY}/T_S$ and "$B_{\Delta T}$" denotes a residue of $\Delta T_{XY}/T_S$. "$T_S$" denotes a sampling interval of the position command value.

In this exemplary embodiment, the same advantages can be attained as those of the first exemplary embodiment.
Modification of Exemplary Embodiment(s)

The invention is not limited to the above-described exemplary embodiments, but includes any modifications, improvements and the like as long as an object of the invention can be achieved.

Though the moving mechanism 2 includes three moving axes orthogonal to each other according to the exemplary embodiments, the moving mechanism may include two or four or more moving axes. In addition, the moving axes may not be orthogonal to each other. In other words, it is only required that the moving mechanism includes a plurality of moving axes.

Though the position commander 3 outputs the position command value for moving the moving mechanism 2 circularly at a constant angular velocity according to the exemplary embodiments, the angular velocity may not be constant. Also, the position commander may output a position command value for curved motion. At this time, a curvature radius of the curved motion is used in place of the radius R of the circular motion. The frequency is calculated based on the curvature radius and the moving speed of the moving mechanism. In short, it is only required that the position commander outputs a position command value for moving the moving mechanism 2.

Though the controller 1, 1A includes the phase difference correction-amount calculator 53 and the phase difference corrector 54, 54A according to the exemplary embodiments, the controller may not include the phase difference correction-amount calculator or the phase difference corrector.

After the first order differentiation of the position command value outputted from the position commander 3, the feedforward controller 51 adds the position command value multiplied by the feedforward gain $K_{FF}$ to the speed command value according to the exemplary embodiments. However, the feedforward controller may perform the first order differentiation after multiplying the position command value by the compensator.

Though the error corrector 5 corrects the error based on the radius R and frequency f of the circular motion according to the exemplary embodiments, the error may be corrected based on, for instance, only the radius. In other words, it is only required that the error is corrected based on at least one of the radius and frequency of the circular motion.

The entire disclosure of Japanese Patent Application No. 2008-148986, filed Jun. 6, 2008, is expressly incorporated by reference herein.

What is claimed is:

1. A controller that controls a moving mechanism comprising a plurality of moving axes, the controller comprising:
   a position commander that outputs a position command value for moving the moving mechanism; and
   an error corrector that corrects an error between the position command value and a position of the moving mechanism, wherein
   the error corrector comprises:
      a feedforward controller that performs a feedforward control of the moving mechanism based on the position command value;
      a compensator calculator that calculates a compensator of the feedforward controller based on the position command value;
      a phase difference correction-amount calculator that calculates a phase difference correction-amount for correcting a phase difference among the moving axes based on the position command value; and
      a phase difference corrector that corrects the phase difference among the moving axes based on the phase difference correction-amount.

2. The controller according to claim 1, wherein the phase difference corrector corrects the phase difference among the moving axes by performing a coordinate transformation of the position command value based on the phase difference correction-amount.

3. The controller according to claim 1, wherein the phase difference corrector corrects the phase difference among the moving axes by delaying the position command value based on the phase difference correction-amount.

4. A controller that controls a moving mechanism comprising a plurality of moving axes, the controller comprising:
   a position commander that outputs a position command value for moving the moving mechanism;
   an error corrector that corrects an error between the position command value and a position of the moving mechanism, the error corrector comprising:
      a feedforward controller that performs a feedforward control of the moving mechanism based on the position command value; and
      a compensator calculator that calculates a compensator of the feedforward controller based on the position command value; and
   a feedback controller that includes a position controller for outputting to the moving mechanism a speed command value based on the error and performs a feedback control of the moving mechanism, wherein
   the feedforward controller performs a feedforward control of the moving mechanism by performing a first order differentiation of the position command value, multiplying the position command value by the compensator, and adding the position command value to the speed command value.

5. A controller that controls a moving mechanism comprising a plurality of moving axes, the controller comprising:
- a position commander that outputs a position command value for moving the moving mechanism; and
- an error corrector that corrects an error between the position command value and a position of the moving mechanism, wherein the error corrector comprises:
- a feedforward controller that performs a feedforward control of the moving mechanism based on the position command value;
- a differentiator for differentiating the position command value to output a speed command value; and
- a compensator calculator that calculates a compensator to be multiplied with the speed command value based on the position command value.

6. The controller according to claim 5 wherein the position commander outputs the position command value for circularly moving the moving mechanism, and the error corrector corrects the error based on at least one of a radius and a frequency of the circular motion.

7. The controller according to claim 5, wherein the error corrector corrects the error based on the position of the moving mechanism.

* * * * *